United States Patent

Walsh et al.

[11] 4,080,667
[45] Mar. 28, 1978

[54] WATER SAVING DEVICE

[75] Inventors: Robert M. Walsh, Moorestown; John V. Droughton, Keyport, both of N.J.

[73] Assignee: AQM Corporation

[21] Appl. No.: 264,546

[22] Filed: Jun. 20, 1972

[51] Int. Cl.² .......................... E03D 1/20; E03D 1/34; E03D 5/02; E03D 5/10
[52] U.S. Cl. ........................................................ 4/415
[58] Field of Search .............. 4/1, 18 R, 67 A, 57 D, 4/34, 41, 42, 28, 20, 29

[56] References Cited

U.S. PATENT DOCUMENTS

| | | | |
|---|---|---|---|
| 1,323,703 | 12/1919 | Linfoot | 4/18 R |
| 3,041,630 | 7/1962 | Williams | 4/57 R |
| 3,080,567 | 3/1963 | King | 4/67 A |
| 3,151,337 | 10/1964 | Deniz | 4/67 A |
| 3,259,918 | 7/1966 | Walker, Jr. et al. | 4/18 |
| 3,812,544 | 5/1974 | Risley | 4/18 |
| 4,009,497 | 3/1977 | Moon | 4/18 |

Primary Examiner—Henry K. Artis
Attorney, Agent, or Firm—Stanley B. Kita

[57] ABSTRACT

Apparatus is provided for installation in the water tank of a toilet to reduce the quantity of water discharged from the tank during flushing while maintaining a satisfactory flushing action. The apparatus comprises a pair of flat, flexible partition elements which extend in a bowed manner between the front and rear walls of the tank on opposite sides of the tank-drain. A bead of deformable gasket material extends along the side and bottom edges of each partition, and the bead is urged into frictional engagement with the walls by the tendency of the partition to straighten from its bowed position. The partition elements form pockets on each side of the drain for containing water near the bottom of the tank while permitting water above the drain and the pockets to flow down the drain when the toilet is flushed.

17 Claims, 4 Drawing Figures

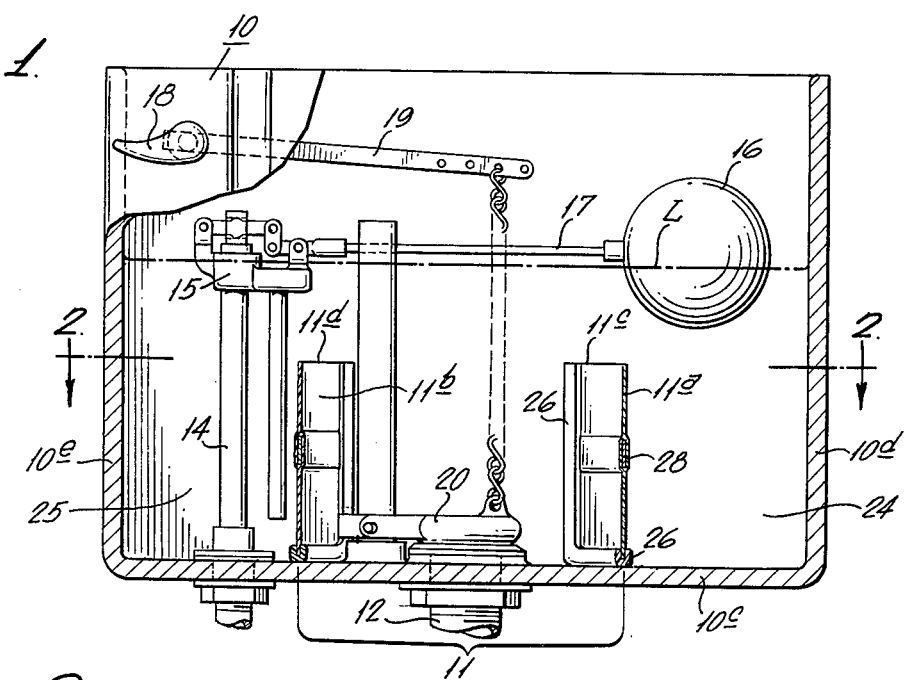
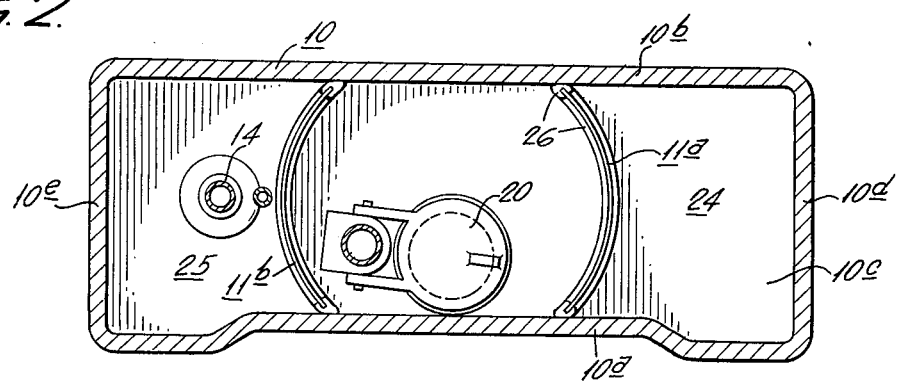
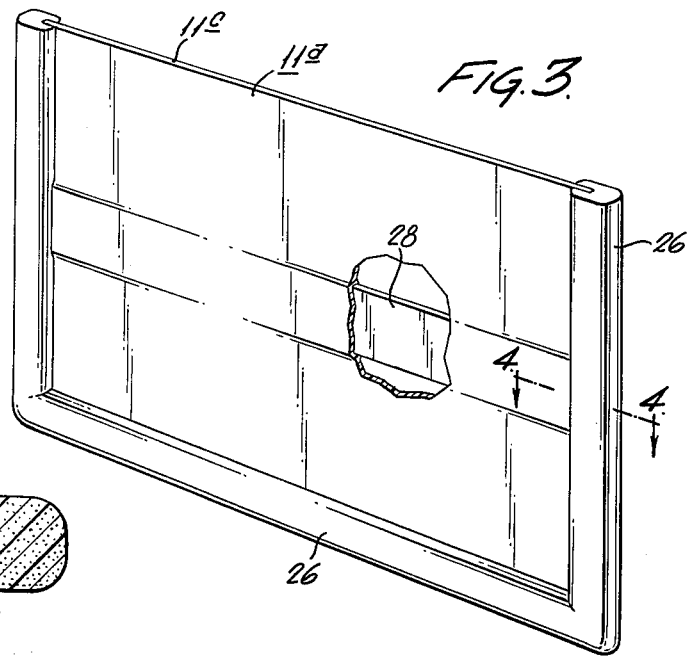
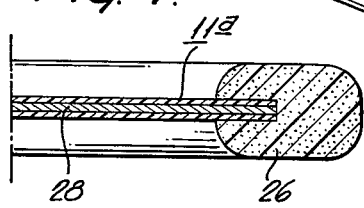

WATER SAVING DEVICE

The present invention relates to water conservation apparatus, and more particularly, the present invention relates to apparatus which is adapted to be installed in the water tank of a toilet to reduce the quantity of water which is required to effect a satisfactory flushing action.

It is known that adequate flushing of a toilet depends on a so-called "siphon effect" which creates the downward swirling flow of water in a toilet bowl. The siphon effect in turn is dependent to a large extent on the head of water available. Although attempts have been made to conserve water by reducing the capacity of the tank, such attempts have not been entirely satisfactory. For instance, some attempts contemplate the placement of solid objects in the tank to reduce its volume, and other attempts contemplate the installation of complex and expensive dike apparatus around the drain in the tank. Although the diking apparatus is least objectional, heretofore there has not been available such apparatus which is simple and capable of being installed by an average homeowner without the use of tools.

With the foregoing in mind, it is a primary object of the present invention to provide novel means for conserving water used to flush a toilet while maintaining a satisfactory flushing action.

It is another object of the present invention to provide for use in a toilet-tank an improved diking apparatus which is capable of being installed readily by an average homeowner without requiring any tools.

As a further object, the present invention provides unique diking apparatus which is of simple but durable construction and which is relatively inexpensive to fabricate.

More specifically, in the present invention a toilet-tank having upstanding front and rear walls and a bottom with a drain is provided with diking means which extends between the walls adjacent the drain to form pockets remote from the drain for preventing water in the pockets from exiting the drain when the toilet is flushed. In the present instance, the diking means includes a pair of upstanding, flexible partition elements which are bowed outwardly from the drain and which have edges that are maintained in frictional engagement with the walls of the tank by the tendency of the bowed elements to straighten. A bead of deformable gasket material extends along the side and bottom edges of each of the partition elements to prevent water from leaking from the pockets during flushing. Preferably, the elements are fabricated of a rectangular sheet of polyvinyl chloride and the gasket bead is of polyurethane foam which encircles the side and bottom edges of the sheet. If desired, a band of steel may be embedded in the sheet of polyvinyl chloride to increase the stiffness of each partition element.

These and other objects, features and advantages of the present invention should become apparent from the following description when taken in conjunction with the accompanying drawings in which:

FIG. 1 is a sectional view of a toilet tank having diking apparatus embodying the present invention;

FIG. 2 is a sectional view taken along line 2—2 of FIG. 1 and illustrating a pair of bowed partition elements which compose the diking apparatus of the present invention;

FIG. 3 is an enlarged perspective view of one of the partition elements illustrated in FIGS. 1 and 2, the element being partially broken away to expose a steel band embedded therein; and FIG. 4 is a greatly enlarged sectional view taken along line 4—4 of FIG. 3 to illustrate the manner in which a bead of gasket material is mounted on the partition element.

Referring now to the drawing, there is illustrated in FIGS. 1 and 2 a toilet-tank 10 in which diking apparatus 11 of the present invention is mounted. The tank 10 has upstanding front and rear walls $10^a$ and $10^b$ respectively, and a bottom $10^c$ in which is provided a central drain 12. The tank 10 also has end walls $10^d$ and $10^e$, and the tank 10 has a substantially rectangular plan configuration with the front and rear walls $10^a$ and $10^b$ being closer together than the end walls $10^d$ and $10^e$. Conventional flushing and filling control apparatus which includes an upstanding water inlet 14 with a valve 15, a float ball 16 and arm 17 connected to the valve 15, and a handle 18 connected through linkage 19 to a stopper 20 for the drain 12 is provided in the tank 10. Because the operation of the control apparatus is so well known, its operation need not be described herein.

In accordance with present invention the diking apparatus 11 operates to conserve water while ensuring a satisfactory flushing action. To this end, the diking apparatus 11 operates to contain a portion of the total water content of the tank 10 each time the toilet is flushed; however, since the contained water is located near the bottom of the tank, it does not affect the hydraulic head in the tank 10. In the illustrated embodiment, the diking apparatus 11 comprises a pair of upstanding partition elements $11^a$ and $11^b$ which extend in an outwardly bowed manner between the front and rear walls $10^a$ and $10^b$ of the tank on opposite sides of the drain 12. As best seen in FIG. 3, each partition element, such as the element $11^a$, is flat and relatively thin, and each has a rectangular configuration with a height or width of preferably 5 inches and length of preferably 7½ inches. Each has an edge of weir $11^c$ and $11^d$ respectively, spaced a predetermined distance from the bottom $10^c$ of the tank 10.

When installed in the manner illustrated, the partition elements $11^a$ and $11^b$ form pockets 24 and 25, respectively on opposite sides of the drain 12 in which a portion of the total water capacity of the tank is retained each time the toilet is flushed.

It is noted that the tank is normally filled to a level L with water as determined by the control apparatus. When the stopper 20 is lifted, the water immediately above the drain 12 and inside of the partition elements $11^a$ and $11^b$ flows down the drain 12. The portion of the water which overlies the pockets 24 and 25 flows across the top edges $11^c$ and $11^d$ of the partition elements $11^a$ and $11^b$ and down the drain 12. In this manner, a head of water corresponding to the distance between the bottom of the tank and the water level L is available for initiating and maintaining the siphon action required to ensure a satisfactory flushing. It has been determined that the retention of water in the pockets 24 and 25 by the diking apparatus 11 does not have any adverse effect on the flushing action.

In order to prevent the water retained in the pockets 24 and 25 from leaking past the partition elements $11^a$ and $11^b$ after the tank 10 has been flushed and during subsequent filling, gasket means is provided along the side and bottom edges of each partition element. In the present instance, the gasket means includes a bead 26 of resiliently deformable friction material such as polyurethane. As best seen in FIG. 4, the bead 26 surrounds the side and bottom edges of the planar portion of the partition element 11$^a$, and when installed in the manner illustrated in FIGS. 1 and 2, the bead 26 deforms to the contour of the inside of the walls 10$^a$ and 10$^b$ and the bottom 10$^c$ to provide a leak-resistant joint. Moreover, the nature of the polyurethane material is such that it provides a friction-gripping action against the walls of the tank.

The planar portion of the partition element 11$^a$ is fabricated of plastic, non-corrosive material such as polyvinyl chloride. In order to augment the inherent stiffness of the polyvinyl chloride, a band of steel 28 may be embedded in the partition element 11$^a$. As illustrated in FIG. 3, the band 28 extends between the side edges of the partition element 11$^a$ at about its median. Since the band 28 is protected from corrosion by the polyvinyl chloride material, the band may be of low-cost, spring-type carbon steel. The steel band 28 may be embedded in the partition element 28 either by being laminated between two sheets of polyvinyl chloride or by being extruded with the polyvinyl chloride through a die or by being molded.

To install the diking apparatus 11 in the tank 10, the tank is preferably drained of water; however, this is not absolutely necessary. Each partition element 11$^a$ and 11$^b$ is bowed and inserted downwardly into the tank 11 on one side of the drain 12 until it abuts the bottom 10$^c$ of the tank 10, at which time it is released to permit its gasket bead to engage the front and rear walls 10$^a$ and 10$^b$ respectively of the tank 10. Care should be taken to ensure that the partition elements are positioned so as not to interfere with the level control apparatus in the tank 10.

When the tank is flushed, a quantity of water (about 30-50% of the capacity of the tank) is retained in the pockets 24 and 25 behind the partition elements 11$^a$ and 11$^b$, respectively. As a result, enough water is released at a sufficient hydraulic head to initiate and maintain the desired siphon action. It is noted that even though the water retained in the pockets 24 and 25 is not released each time the tank 10 is flushed, a sufficient mixing action occurs during filling of the tank 10 to prevent stagnation in the pockets 24 and 25.

The length or distance between the upright edges of each partition element is selected so as to be greater than the distance between the front and rear walls of a tank to ensure that the elements bow when installed in a tank. Since tank dimensions vary among various manufacturers and styles, it has been determined that the dimension of 7½ inches set forth above enables the partition elements to be installed in a wide range of tank-sizes, the elements bowing to a greater or lesser extent depending on the distance between the front and rear walls of the tanks. Of course, it should be understood that the dimensions set forth are by way of example, and partition elements so dimensioned operate satisfactorily in a majority of toilet tanks. However, it may be necessary to provide partition elements having different dimensions to enable them to be used with older tanks or possibly in tanks yet to be produced.

In view of the foregoing, it should be apparent that novel diking apparatus has been provided for use in a toilet-tank to conserve water. The diking apparatus is of simple but rugged construction, and it is inexpensive to fabricate. Moreover, the diking apparatus is capable of being installed by an average homeowner without requiring any tools.

While a preferred embodiment of the present invention has been described in detail, various modifications, alterations and changes may be made without departing from the spirit and scope of the present invention as defined in the appended claims.

We claim:

1. In combination with a toilet having a water tank with a bottom, a drain located in the bottom, and upstanding walls, the improvement comprising: dike means in said tank for limiting the quantity of water exiting the drain during flushing while maintaining a pressure head adequate to initiate and maintain a siphon action in the toilet, said dike means including a pair of flexible upstanding partition elements having upright side edges engaging opposite tank walls, said partition elements projecting upwardly in bowed relation from said bottom and terminating in edges a spaced distance from said bottom, said partition elements extending between said walls and being spaced from said drain to define a pair of pockets remote from said drain for retaining water below said edges each time the toilet is flushed while permitting water above the drain and pockets to exit the drain for establishing the siphon action, each of said partition elements including a metal member extending between said side edges and a layer of corrosion-resistant material on opposite sides of said metal member.

2. Apparatus according to claim 1 wherein said walls include front and rear tank walls spaced apart a predetermined dimension and wherein each partition element has a dimension between said side edges greater than said predetermined dimension of said tank between said front and rear walls so that said partition elements bow in an upright plane when said partition elements are disposed in the tank with their upright side edges engaged with the front and rear walls of the tank.

3. Apparatus according to claim 2 wherein each partition has a bottom edge adapted to engage the bottom of the tank, and including means providing a gasket along said upright edges and said bottom edge of each partition element, whereby leakage of water from the pockets behind the partition elements is prevented during draining and subsequent filling of the tank.

4. Apparatus according to claim 3 wherein said gasket means is composed of deformable friction material and said partition elements are bowed outwardly of said drain, whereby the partition elements are secured in position by friction applied along said gasket means.

5. Apparatus according to claim 1 wherein said metal member is fabricated of spring steel and said corrosion-resistant material is plastic molded around said spring steel member.

6. Apparatus according to claim 1 wherein said metal member is fabricated of steel.

7. Apparatus according to claim 1 wherein said corrosion-resistant material is polyvinyl chloride.

8. For use in a toilet tank having front and rear walls and a bottom with a drain, a flexible dike element adapted to be installed in said tank between said front and rear walls to form a water pocket on one side of said drain, said dike element having top and bottom edges and side edges, said dike element having a predetermined widthwise dimension between said top and bottom edges and having a lengthwise dimension between said side edges greater than the distance between said tank walls so that said dike element bows when installed between said walls, said dike element comprising a flexible metal member extending lengthwise between said side edges, a layer of corrosion-resistant material on opposite sides of said metal member, and gasket means extending along said side edges and bottom edge of said dike element for engaging said tank walls when the dike element is installed in the tank to minimize leakage from the water pocket.

9. A dike element according to claim 8 wherein said dike element has a substantially rectangular shape with its lengthwise dimension being greater than its widthwise dimension.

10. A partition element according to claim 9 wherein said widthwise dimension is about 5 inches and said lengthwise dimension is about 7½ inches.

11. A partition element according to claim 8 wherein said metal is steel.

12. A partition element according to claim 11 wherein said steel is spring-type steel.

13. A partition element according to claim 8 wherein said corrosion-resistant material is a plastic molded around said metal member to cause said metal member to be embedded therein and thereby protected from corrosion.

14. A partition element according to claim 13 wherein said plastic corrosion-resistant material includes polyvinyl chloride.

15. A partition element according to claim 8 wherein said gasket is fabricated of resiliently deformable friction material.

16. A particion element according to claim 15 wherein said friction material includes polyurethane.

17. A dike element according to claim 8 wherein said metal member is of spring steel and said layer of corrosion-resistant material is provided by a substantially rectangular plastic body encasing said metal member and mounting said gasket means along said edges thereof.

* * * * *

UNITED STATES PATENT AND TRADEMARK OFFICE
CERTIFICATE OF CORRECTION

PATENT NO. : 4,080,667
DATED : March 28, 1978
INVENTOR(S) : Robert M. Walsh; John V. Droughton It is certified that error appears in the above-identified patent and that said Letters Patent are hereby corrected as shown below:

In claims 10-16, change "partition" to "dike".

*Signed and Sealed this*

*Nineteenth* Day of *December 1978*

[SEAL]

Attest:

RUTH C. MASON
*Attesting Officer*

DONALD W. BANNER
*Commissioner of Patents and Trademarks*